United States Patent [19]

Ranjan et al.

[11] Patent Number: 5,631,094
[45] Date of Patent: May 20, 1997

[54] MAGNETIC ALLOY FOR IMPROVED CORROSION RESISTANCE AND MAGNETIC PERFORMANCE

[75] Inventors: Rajiv Y. Ranjan, San Jose; Tu Chen, Monte Sereno; Tsutomu T. Yamashita, Milpitas; John K.-J. Chen, Los Gatos, all of Calif.

[73] Assignee: Komag, Incorporated, Milpitas, Calif.

[21] Appl. No.: 348,547

[22] Filed: Dec. 1, 1994

Related U.S. Application Data

[63] Continuation-in-part of Ser. No. 188,954, Jan. 28, 1994, abandoned.

[51] Int. Cl.$^6$ ..................................................... G11B 5/66
[52] U.S. Cl. .................. 428/611; 428/668; 428/457; 428/694 T; 428/694 TS; 428/900; 428/928; 148/313; 420/435; 420/436; 420/439
[58] Field of Search ............................... 428/694 T, 900, 428/457, 611, 668, 928; 148/313; 420/435, 436, 439

[56] References Cited

U.S. PATENT DOCUMENTS

| | | | |
|---|---|---|---|
| 4,411,963 | 10/1983 | Aine | 428/622 |
| 4,503,125 | 3/1985 | Nelson et al. | 428/408 |
| 4,749,459 | 6/1988 | Yamashita et al. | 204/192.15 |
| 4,786,553 | 11/1988 | Shiroishi et al. | 428/336 |
| 4,786,564 | 11/1988 | Chen et al. | 428/694 |
| 4,789,598 | 12/1988 | Howard et al. | 428/408 |
| 4,792,497 | 12/1988 | Suzuki et al. | 428/336 |
| 4,837,094 | 6/1989 | Kudo | 428/694 |
| 4,898,774 | 2/1990 | Yamashita et al. | 428/336 |
| 4,950,548 | 8/1990 | Furusawa et al. | 428/611 |
| 4,988,578 | 1/1991 | Yamashita et al. | 428/678 |
| 5,004,652 | 4/1991 | Lal et al. | 428/611 |
| 5,024,903 | 6/1991 | Mizukami | 428/694 |
| 5,045,165 | 9/1991 | Yamashita | 204/192.16 |
| 5,049,451 | 9/1991 | Lal et al. | 428/622 |
| 5,112,669 | 5/1992 | Yoden et al. | 428/141 |
| 5,162,158 | 11/1992 | Christner et al. | 428/611 |
| 5,180,640 | 1/1993 | Yamashita et al. | 428/611 |
| 5,282,946 | 2/1994 | Kinoshita et al. | 204/298.13 |

FOREIGN PATENT DOCUMENTS

| | | |
|---|---|---|
| 0330116A2 | 8/1989 | European Pat. Off. . |
| 205242 | 8/1993 | Japan . |
| 290352 | 11/1993 | Japan . |
| 314468 | 11/1993 | Japan . |
| 06124832 | 5/1994 | Japan . |

OTHER PUBLICATIONS

Williams and Comstock, "An Analytical Model of the Write Process in Digital Magnetic Recording", 17th Annual AIP Conf. Proc., Part I, No. 5, 1971, pp. 738–742.

Zhu et al., "Micromagnetic Studies of Thin Metallic Films", Journal of Applied Physics, vol. 63, No. 8, 1988, p. 3248.

Chen et al., "Physical Origin of Limits in the Performance of Thin–Film Longitudinal Recording Media", IEEE Trans. Mag., vol. 24, No. 6, 1988. p. 2700.

Maeda, H., "Effects of Nitrogen on the High Coercivity and Microstructures of Co–Ni Alloy Films", Journal of Applied Physics, vol. 53, No. 10, 1982, pp. 6941–6945.

(List continued on next page.)

*Primary Examiner*—Stevan A. Resan
*Attorney, Agent, or Firm*—Jonathan A. Small

[57] ABSTRACT

A new magnetic alloy exhibits high Hc and Ms while exhibiting excellent corrosion resistance, thereby providing ideal physical properties for high density recording applications. Other parameters of the media, such as SNR, PW50, and S are at least maintained, if not also improved. The alloy contains cobalt and up to 10 at. % Ni, up to 20 at. % Pt, up to 10 at. % Ta, up to 10 at. % Ti, and optionally up to 6 at. % B. The ratio of the tantalum to titanium in the alloy is between 3:1 and 1:3. The alloy is deposited by vacuum deposition (typically sputtering) on a similarly deposited non-magnetic Ni alloy under layer. Nitrogen and/or oxygen may be introduced into the alloy during deposition to improve SNR. Other corrosion-resistant thin film alloys may also be obtained by the inclusion of Ta and Ti.

3 Claims, 5 Drawing Sheets

OTHER PUBLICATIONS

Murdock et al., "Roeamap to 10 Gb/in$^2$ Media: Challenges", IEEE Trans. Mag., 1992, p. 3078.

Opfer et al., "Thin Film Memory Disk Development", Hewlett Packard Journal, Nov., 1985, pp. 4–10.

Aboaf et al., "Magnetic Properties and Structure of Co–Pt Thin Film", IEEE Trans. Mag., MAG–19, No. 4, 1983, p. 1514.

Johnson et al., "Composition Effects on Recording Properties of CoPtCr Thin Film Media", IEEE Trans. Mag., MAG–29, No. 6, 1993, p. 3670.

King, "Datapoint Thin Film Media", IEEE Trans. Mag., MAG–17, No. 6, Jul. 1981, pp. 1376–1379.

FIG_1

FIG_2

FIG_3

FIG_4

FIG_5

FIG_6

FIG_7

FIG_8

FIG_9

MAGNETIC ALLOY FOR IMPROVED CORROSION RESISTANCE AND MAGNETIC PERFORMANCE

CROSS REFERENCE TO RELATED APPLICATIONS

This is a continuation-in-part application based on U.S. application Ser. No. 08/188,954, filed Jan. 28, 1994 now abandoned.

FIELD OF THE INVENTION

The present invention relates generally to thin film magnetic recording media of the type used in rigid disk drives for computer data storage, and in particular relates to an improved alloy for a magnetic layer of the media providing improved corrosion resistance, and also having the necessary properties to support high recording density applications.

BACKGROUND OF THE INVENTION

Recording performance for magnetic disks is determined by three basic characteristics æ narrow PW50, high overwrite, and low noise. PW50 is the pulse width of the bits expressed in either time or distance, defined as the width of the pulse at half-maximum. Having a narrower (and more well-defined) pulse allows for higher recording density. A wide PW50 means that the bits are crowded together, causing them to interfere with each other. This interference is termed inter-symbol interference. Excessive inter-symbol interference limits the packing density of bits in a given area.

Conventionally, there are number of media factors which affect PW50. In order to achieve narrow PW50, the coercivity ("Hc") of the media must be high. However, if Hc is too high, the head field will have a difficult time saturating the media, resulting in poor overwrite. Overwrite ("OW") is a measure of the ability of the media to accommodate overwriting existing data. That is, OW is a measure of what remains of a first signal after a second signal (for example of a different frequency) has been written over it. OW is poor when a significant amount of the first signal remains. OW is generally affected by Hc, thickness, and the hysteresis loop squareness of the film.

PW50 may be reduced by using a thinner magnetic film. Another means of reducing PW50 is to increase hysteresis loop squareness, and narrow the switching field distribution, as described by William and Comstock in "An Analytical Model of the Write Process in Digital Magnetic Recording," A.I.P. Conf. Proc. Mag. Materials, 5, p. 738 (1971). Hysteresis loop squareness ("S") has several components, including coercivity squareness ("S*") and remnant coercivity squareness ("S*rem").

Noise performance of a magnetic film can be defined in terms of read jitter and write jitter. Noise, together with inter-symbol interference, contributes to the uncertainty in the location of the individual bits, which cause the data to be read with some displacement in timing from that which is expected. This displacement is referred to as bit shift. The bit shift needs to be reduced to a minimum for a given timing window of the bit in order to assure accuracy in reading the bit.

Read jitter is primarily determined by the mount of signal available from the bit, and the electronic noise in the channel. A thicker magnetic film will typically provide reduced read jitter. Unlike read jitter, write jitter is determined by the intrinsic noise of the film. Intrinsic media noise has been theoretically modeled by Zhu et al. in "Micromagnetic Studies of Thin Metallic Films", J. Appl. Phys., vol. 63, no. 8, p. 3248 (1988), which is incorporated by reference herein. Chen et al. describe the source of intrinsic media noise in "Physical Origin of Limits in the Performance of Thin-Film Longitudinal Recording Media," IEEE. Trans. Mag., vol. 24, no. 6, p. 2700 (1988), which is also incorporated by reference herein. The primary source of intrinsic noise in thin film media is from the interparticle exchange interaction. In general, the higher the exchange interaction, the greater the noise.

The noise from interparticle exchange interaction can be reduced by isolating the individual particles. This may be accomplished by spacing the grains apart from one another, or by interposing a non-magnetic material or insulator at the grain boundaries, as described by Chen et al. in the aforementioned "Physical Origin of Limits in the Performance of Thin-Film Longitudinal Recording Media." The mount of separation needs to be only a few angstroms. There is another interparticle interaction, called magnetostatic interaction, which acts over a much greater distance between particles as compared to the exchange interaction. Reducing the magnetostatic interaction does reduce intrinsic media noise slightly. However, the effects of magnetostatic interaction actually improve hysteresis loop squareness and narrow the switching field distribution, and hence improve PW50 and OW. Therefore, magnetostatic interaction is generally tolerated.

In order to obtain the best performance from the magnetic media, each of the above criteria—PW50, noise and OW—must be optimized. This is a formidable task, as each of these performance criteria are interrelated. For example, obtaining a narrower PW50 by increasing the Hc will adversely affect OW, since increasing Hc degrades OW. A thinner media and lower remnant magnetization-thickness product ("MrT") yields a narrower PW50, however the read jitter increases because the media signal is reduced. Increasing squareness of the hysteresis loop contributes to narrower PW50 and better OW, but generally increasing squareness increases noise. Thus, the amount that PW50 may be narrowed is limited by the increase in noise. Providing a mechanism for separating or isolating the grains to break the exchange coupling can effectively reduce the intrinsic media noise. Noise is improved by eliminating the interparticle exchange interaction. A slight further reduction of noise is possible by reducing magnetostatic interaction, but this reduces the hysteresis loop squareness and increases the switching field distribution, which degrades PW50 and OW.

In order to obtain the optimum media performance, the remnant magnetization-thickness product ("MrT") must be reduced for better OW and PW50, but still retain sufficient signal to maintain acceptable read jitter. This is principally accomplished by reducing the film thickness, and using an alloy having a higher saturation magnetization ("Ms").

Therefore, an optimal thin film magnetic recording media for high density recording applications, i.e., that can support high bit densities, requires low noise without sacrificing the switching field distribution, S*, and S*rem. Recording density can then be increased since bit jitter is reduced. In order to achieve the best compromise in performance, the individual grains of the magnetic film must be isolated to eliminate the exchange interaction, and grains must be uniform and have a tight distribution of sizes to minimize intrinsic media noise while maintaining high hysteresis squareness.

One type of magnetic media which has allowed optimizing the above performance criteria is based on alloys of cobalt and platinum. Typical examples of such an alloy include CoPt, CoNiPt, CoCrPt, and CoNiCrPt. Attributes of Co-Pt alloys have been described by Murdock et al. in "Roadmap to 10 Gb/in$^2$ Media: Challenges", IEEE Trans. Mag., 1992, page 3078, by Opfer et al. in "Thin Film Memory Disk Development", Hewlett-Packard Journal, Nov. 1985, and by Aboaf et al., in "Magnetic Properties and Structure of Co-Pt Thin Film", IEEE Trans. Mag., page 1514, 1983, each incorporated herein by reference. Increasing storage capacity demands and performance requirements have motivated a search for ways to improve Co-Pt based alloys.

As mentioned by Yamashita et al. in U.S. Pat. No. 5,180,640, also incorporated herein by reference, typical Co-Pt alloys suffer from poor resistance to corrosion. This is of increasing concern as modern recording media are integrated into portable computers and specialized applications which are exposed to increasingly hostile environments such as extremely high or low temperatures, high humidity, etc. Therefore, the Co-Pt base is typically combined with corrosion resistant elements to enhance corrosion resistance while still providing the desired magnetic properties. For example, Howard et al., in U.S. Pat. No. 4,789,598, teaches the addition of greater than 17 atomic percent ("at. %") of the non-magnetic material chromium (Cr) to a Co-Pt alloy to obtain improved resistance to corrosion. However, the corrosion resistance obtained by adding such a large percentage of Cr to the Co-Pt alloy has a detrimental effect on a number of the magnetic properties of the thin film, for example a substantial reduction of the Ms of the film. As described above and otherwise well known, it is desirable to provide the highest possible Ms to allow the magnetic film to be kept as thin as possible to facilitate better magnetic field penetration and increased magnetic field gradient from the writing head due to the reduction in the spacing between the head and the magnetic layer, both of which are known to result in lower PW50 and better OW.

One approach to minimizing the detrimental effect of adding a large percentage of Cr to the Co-Pt alloy is to simply reduce the amount of Cr added. However, this approach is limited by the at. % of the non-magnetic material required to obtain the desired degree of corrosion resistance. For example, as taught by Yamashita et al. in U.S. Pat. No. 5,180,640, the corrosion resistance drops sharply for less than 10 at. % of Cr in the CoCrPt alloys. In addition, SNR also decreases with decreasing Cr percentage, as taught by K. E. Johnson et al. in "Composition Effects on Recording Properties of CoPtCr Thin Film Media" IEEE Trans. Mag., MAC-29, vol. 6, page 3670 (1993).

Another approach to minimizing the detrimental effect of adding a large percentage of Cr to the Co-Pt alloy is to introduce a combination of nickel (Ni) and Cr. This results in enhanced corrosion resistance while maintaining a higher Ms, since Ni is ferromagnetic. This approach is disclosed in the aforementioned U.S. Pat. No. 5,180,640 of Yamashita et al., which teaches adding 3 to 8 at. % Ni together with 5 to 10 at. % Cr in combination to form the quaternary alloy. This alloy has been shown to provide good corrosion resistance and higher Ms than that taught by Howard et al. However, it is desirable to further reduce or, if possible, completely eliminate the Cr content of the alloy.

A number of references have suggested adding tantalum (Ta) and/or boron (b) to the magnetic layer to improve corrosion resistance. For example, the Japanese patent specifications of Hitachi nos. JP05290352-A and JP05314468-A each discuss the addition of Ta. While it is inferred from these two references that the addition of Ta serves to improve corrosion resistance, there is no mention in either reference of the negative aspects of the addition of Cr. In fact, the alloys taught by each of these references include Cr in addition to Ta.

Another reference discussing the addition of Ta is Furusawa et al. in U.S. Pat. No. 4,950,548. teaches the addition of tantalum and/or titanium (Ti) for the purpose of imparting corrosion resistance to the alloy. However, none of the references have demonstrated an alloy with any specific combination of tantalum and titanium which simultaneously provide improved corrosion resistance, higher coercivity, higher saturation magnetization, and higher squareness.

With recording density increasing at a rate of about 30 to 60% per year, and with disk drives becoming increasingly portable, magnetic media are expected to simultaneously have increasingly higher corrosion resistance and improved magnetic performance. A higher Ms alloy for the magnetic media not only enhances recording performance but also reduces the cost of the disk—a thinner film is deposited which enhances the throughput and utilization time of the deposition system. The benefits of enhanced coercivity and squareness are also well known.

SUMMARY OF THE INVENTION

Therefore, it is an object of the present invention to provide a magnetic recording media having a magnetic alloy layer which simultaneously exhibits improved corrosion resistance, higher coercivity, higher saturation magnetization, and higher squareness. This object is provided by a careful selection of the concentrations and proportions of tantalum and titanium, and the elimination of chromium, from the alloy layer.

We have developed a new magnetic alloy which exhibits high Hc and Ms while exhibiting excellent corrosion resistance, thereby providing ideal physical properties for high density recording applications. Other parameters of the media, such as SNR, pulse-width-at-half-maximum ("PW50"), and S are at least maintained, if not also improved. Specifically, the alloy may contain up to 10 at. % of Ni, up to 20 at. % of Pt, up to 10 at. % of titanium (Ti), up to 10 at. % of tantalum (Ta), and the balance (typically at least 75 at. %) of cobalt (Co). In one embodiment, the alloy contains both Ti and Ta in combination such that the total at. % of Ti and Ta is approximately 1.5–3.0 at. % each. The ratio of tantalum to titanium in the alloy is typically within the range of 3:1 (three parts tantalum to one part titanium) to 1:3 (one part tantalum to three parts titanium). Particularly favorable results are observed at proportional concentrations for tantalum and titanium of 3:1 and Importantly, it has been discovered that while the addition of materials such as chromium to the magnetic alloy layer of thin film recording media is beneficial in reducing corrosion due to exposure to moisture in the atmosphere, such materials are nonmagnetic and adversely impact the magnetic parameters of the media. Thus, there has historically been a tradeoff between corrosion resistance and magnetic performance of thin film recording media. However, one aspect of the present invention is the realization that the addition of the combination of tantalum and titanium in the proper concentrations and ratio can provide a greater degree of corrosion resistance than the comparable amount of chromium. Thus, the same degree of corrosion resistance provided by chromium can now be provided by a lesser amount of the tantalum/titanium combination, and thus there is less of a negative impact on the magnetic recording parameters. For example, a total of three atomic percent tantalum and titanium has been shown herein to provide better corrosion resistance and higher coercivity than four atomic percent chromium in the equivalent alloy. Therefore, one key aspect to the present invention is to minimize the addition of nonmagnetic material to the magnetic alloy while maintaining corrosion resistance.

The alloy is deposited by vacuum deposition (typically sputtering) on a similarly deposited non-magnetic Ni alloy under layer. In order to further enhance the SNR, and bring Hc above about 1500 Oe, we have also added boron (B) into the magnetic alloy in a concentration of up to about 6 at. %. Employing the alloys of TaTi or TaTiB with the CoPt alloy is found to provide improved corrosions resistance as compared to Cr, while at the same time providing higher Ms and other improved magnetic properties.

The addition of TaTi is contrary to the general trend in the industry to add Cr (as per Howard et al.) or add NiCr (as per Yamashita et al.) or other Cr-based alloy to enhance corrosion resistance, yet we have obtained both increased corrosion resistance and improved magnetic performance. Accordingly, a detailed description of our invention, and of the above and other advantages is described in greater detail below.

BRIEF DESCRIPTION OF THE DRAWINGS

The present invention will be described in greater detail below, including specific examples thereof, with regard to the figures, in which.

As between each of these figures, like reference numerals shall denote like elements.

DETAILED DESCRIPTION

Figure 1:
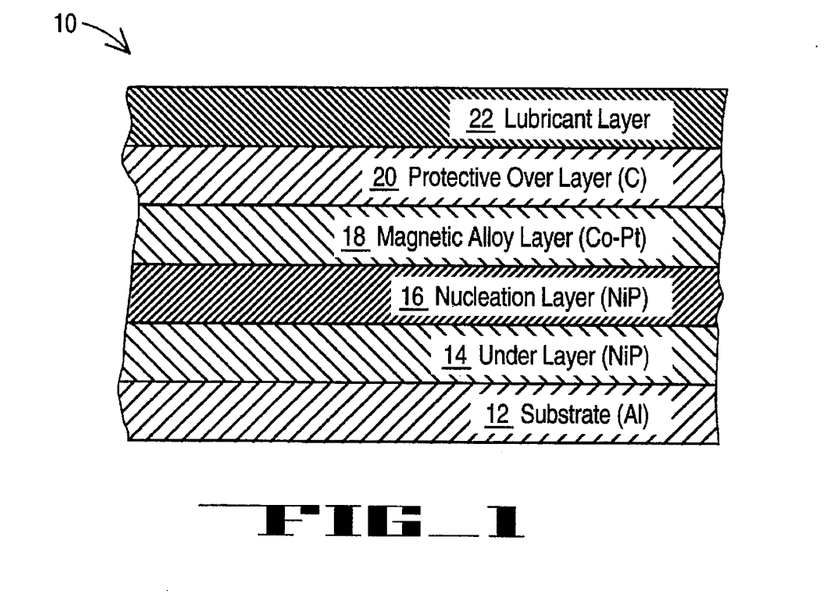
FIG. 1 illustrates a cross section of a magnetic disk constructed in accordance with one embodiment of our invention.

FIG. 1 is a cross section of a rigid thin-film magnetic disk 10 constructed in accordance with the present invention. Disk 10 consists of an aluminum alloy substrate 12 onto which a plated layer 14, typically of NiP, is formed by electroless plating or other methods well known in the art. Layer 14 typically has a thickness in the range of 5 to 20 μm.

The plated layer 14 of NiP provides strong mechanical support on the relatively soft aluminum substrate 12. After layer 14 is plated onto substrate 12, the disk is polished, textured, and cleaned. Although the embodiment described in detail herein employs an aluminum substrate, media based on other substrate materials such as glass, Memcor (a Trademark for a Corning proprietary glass ceramic material), carbon-based materials, silicon, titanium, stainless steel, etc., are equally within the contemplation of the present invention.

A sputtered nucleation layer 16, typically of amorphous NiP, is then deposited onto layer 14. In one embodiment, this may be accomplished by sputtering as described in U.S. Pat. No. 4,786,5 64, issued to Chen et al., which is incorporated herein by reference, although other methods such as ion plating and evaporation are known and available. An example of the sputtering conditions for layer 16 include a pressure of 5 to 40 mTorr and a power density between 2 and 3 watts/cm². In one embodiment, the sputtered nucleation layer 16 consists of 85 at. % Ni and 15 at. % P (represented by the notation $NiP_{0.15}$, where the missing subscript denotes the balance of the alloy). Other materials may be deposited with or in place of NiP layer 16. As an example, we have used $Ni_3P$ with 1 at. % $Al_2O_3$ for nucleation layer 16. Typically, nucleation layer 16 is in the range of 30 to 100 nm thick, and is employed to reduce bit shift and increase Hc. In place of layers 14 and 16, a nucleation layer or layers comprised of various materials other than NiP may be employed.

A magnetic alloy layer 18 is then sputtered onto nucleation layer 16. In general, layer 18 is an alloy including Co and Pt. In one embodiment, the alloy further includes Ni. In this embodiment, the platinum concentration is up to 20 at. %, the nickel concentration is up to about 10 at. %, and the cobalt concentration is typically at least about 75 at. %. In addition, the magnetic alloy layer 18 includes Ta in a concentration up to about 10 at. %, and may also include up to about 10 at. % Ti. The concentrations of Ta and Ti may or may not be equal. In one embodiment, magnetic alloy layer 18 includes equal concentrations of 1.5 at. % Ta and Ti. (It may also be desirable to include some amount of Cr, typically less than 3 at. %, in layer 18. However, Ta, Ti, and possibly B, may displace the Cr in part or completely.)

Additionally, B may be added to the magnetic alloy layer 18, for example to increase Hc. The concentration of B in the magnetic layer may vary up to about 6 at. %. Results of our research show that a smaller amount of B, generally 3 at. % or lower, is sufficient to enhance the coercivity and also reduce the noise (thereby improving the signal-to-noise ratio) of our selected alloy without seriously degrading the Ms of the recording medium. One embodiment of the present invention comprises a magnetic alloy layer 18 including 2 at. % boron together with either Ta or a combination of Ta and Ti. While the addition of boron is optional, as is shown below the alloy CoNiPtTaTiB is extremely suitable for high to very high recording density applications.

In one embodiment, magnetic alloy layer 18 is RF diode sputtered $CoNi_{0.07}Pt_{0.12}Ta_{0.015}Ti_{0.015}B_{0.02}$, sputtered at 10–35 mTorr and a power density of 1.0–3 watts/cm². Other examples of alloys which can be used are $CoNi_{0.05}Ta_{0.015}Ti_{0.015}B_{0.02}Pt_{0.14}$, $CoNi_{0.05}Ta_{0.1}Ti_{0.01}B_{0.03}Pt_{0.14}$, $CoNi_{0.05}Ta_{0.03}Ti_{0.01}Pt_{0.14}$, etc. In other embodiments, the Ni, Ta, Ti, and B concentrations can be varied to optimize the noise and corrosion resistance. However, the sum of the Ni, Ta, and Ti should not exceed about 20 at. % of the total alloy so as to maintain high Ms. Pt composition can be varied to adjust the Hc of the alloy.

In another embodiment of the present invention, the coercivity, media noise, and squareness of the magnetic alloy can be altered by introducing nitrogen and/or oxygen in concentrations up to 10 percent by volume (vol. %) into the sputtering chamber, as taught for example by Yamashita et al. in U.S. Pat. No. 4,749,459, which is incorporated by reference herein, and the copending application serial no. (not yet assigned) entitled "Thin Film Magnetic Alloy Having Low Noise, High Coercivity and High Squareness". In one embodiment, nitrogen having a concentration of between 1 and 4 vol. % is introduced into the sputtering chamber. Water vapor in the sputtering chamber should be minimized when sputtering alloys according to the present invention, as taught by Yamashita et al. in the aforementioned patent.

A protective over layer 20, typically of carbon, is then deposited onto the magnetic layer 18, e.g., as discussed by F. K. King in "Datapoint Thin Film Media", IEEE Trans. Mag., July 1981, which is incorporated herein by reference. In one embodiment, over layer 20 may be DC magnetron sputtered carbon at 1 to 10 mTorr of pressure, e.g., at about 5 mTorr, and a power density of 1 to 4 watts/cm$^2$, e.g., about 3 watts/cm$^2$. In another embodiment, over layer 20 is carbon sputtered in the presence of hydrogen, e.g., as taught by Yamashita in U.S. Pat. No. 5,045,165, which is incorporated herein by reference. In this embodiment, the carbon is sputtered in an atmosphere of about 20% by volume of $H_2$ in argon at a flow rate of 50 to 100 SCCM. In yet another embodiment, over layer 20 is $ZrO_2$ such as discussed by Yamashita et al. in U.S. Pat. No. 4,898,774, which is incorporated herein by reference. In this embodiment, the $ZrO_2$ may be RF magnetton sputtered at a pressure of 2 to 10 mTorr, and a power density of 2 to 3 watts/cm$^2$.

Although an over layer of carbon is described in detail above, other over layer materials such as ceramic oxides of Zr, Hf, Si, Al, etc., nitrides of Ti, B, Si, W, etc., carbides of W, Ta, Ti, Si, etc., can also be used and are within the scope of the present invention. Furthermore, although carbon sputtered in the presence of $H_2$ or sputtered with $ZrO_2$ provides corrosion protection, as may certain other materials, for many reasons additional resistance to corrosion is desirable and/or necessary. For example, complete coverage of the magnetic alloy layer 18 by the hydrogenated carbon or $ZrO_2$ layer cannot be guaranteed, particularly when the overcoat thickness is reduced to reduce the spacing between the head and the media. Therefore, it is important and advantageous that the magnetic alloy in accordance with our invention resist corrosions as well.

Finally, a lubricant layer 22 of a type known in the art, e.g., a solid or liquid lubricant, is applied to over layer 20. Details of the lubricant layer 22 are beyond the scope of the present invention, and therefore are not discussed in detail herein.

We have performed a number of tests to evaluate the properties of the magnetic layer 18 described above. Table 1 shows electrochemical corrosion test measurements of a number of disks which were made in accordance with the present invention. An aluminum substrate 12 was used having a plated layer 14 of NiP deposited to about 10 μm thick. Sputtered nucleation layer 16 of NiP, magnetic alloy layer 18 of CoNiPtTaTi, and over layer 20 of carbon were sputter deposited as described above using an RF sputtering machine. The composition of the magnetic layer 18 was varied by changing the composition of the sputtering target. An incident RF power density of about 3.0 watts/cm$^2$ was used for layers 16 and 18 on the disks for this test. The undercoat layer 16 of NiP was deposited to a thickness of about 50 rim, and the magnetic layer 18 was also deposited to a thickness of about 30 nm. The over layer 20 of carbon was deposited to a thickness of about 30 nm.

Figure 2:
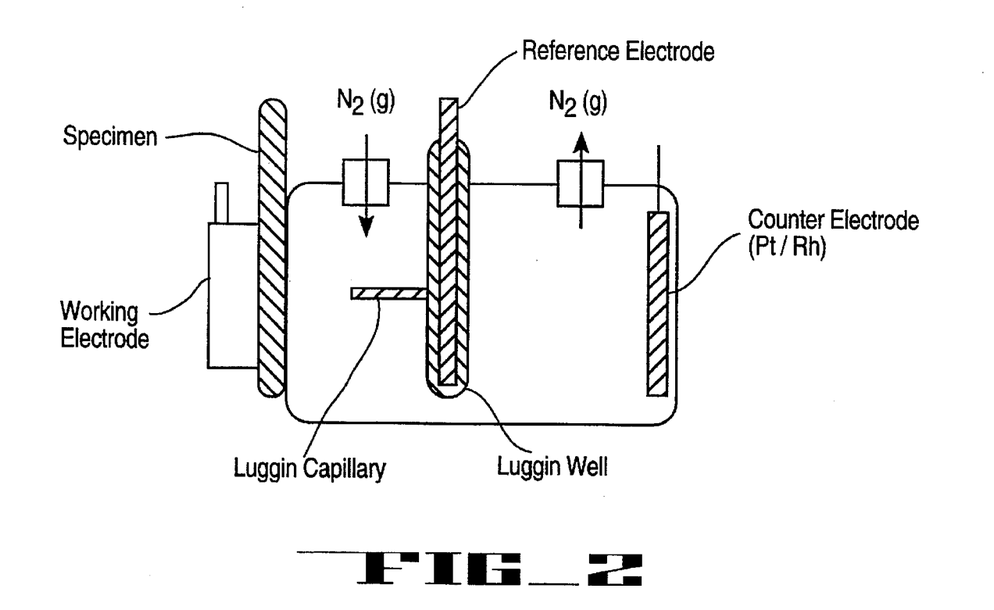
FIG. 2 shows an EG&G PAR Model KO235 flat cell which was used to measure the corrosion current density and polarization resistance of Co-Pt alloys containing Ta and Ti.

All the alloys shown in Table 1 were deposited under identical conditions. The electrochemical corrosion properties of these disks were measured using an EG&G PAR (EG&G Princeton Applied Research, P.O. Box 2565, Princeton, N.J. 08543–2565) Model 273 Potentiostat system. The disks with different magnetic alloys were placed in one end of the flat-cell shown in FIG. 2. The corrosion current and applied potentials were monitored using the EG&G PAR Model 273 Potentiostat system in a manner which has been described in EG&G Princeton Applied Research, Electrochemical Instruments Division's (Princeton, N.J., 08543–5206) Application Note Corr-4, incorporated herein by reference. Results of the electrochemical corrosion tests are shown in Table 1. It should be noted that a higher polarization resistance and lower corrosion current ("$I_{corr}$") indicates higher corrosion resistance. When 9 at. % of nickel in $CoNi_{0.09}Pt_{0.10}Ta_{0.015}$ is replaced by only 1.5 at. % titanium (i.e., $CoPt_{0.10}Ta_{0.015}Ti_{0.015}$) the polarization magnetization increased by about 10 kOhms/cm$^2$. When 9 at. % of nickel in $CoNi_{0.09}Pt_{0.10}$ was replaced by 1.5 at. % tantalum and 3 at. % chromium (i.e., $CoPt_{0.10}Ta_{0.015}Cr_{0.03}$), the polarization resistance increased by about 28 kOhms/cm$^2$. When 1.5 at. % of Ta was added to the $CoNi_{0.09}Pt_{0.10}$ alloy, the polarization resistance increased by about 30 kOhms/cm$^2$, and when an additional 1.5% Ti was added the polarization resistance further increased by about 40 kOhms/cm$^2$. These results show that the addition of Ta-Ti provides a drastic increase in electrochemical corrosion resistance.

TABLE 1

| Alloy | Polarization Resistance (kOhms/cm$^2$) | Corrosion Current $I_{corr}$ (μ A/cm$^2$) |
| --- | --- | --- |
| $CoNi_{.09}Pt_{.10}$ | 42 ± 1.6 | 0.58 ± 0.02 |
| $CoPt_{.10}Ta_{.015}Cr_{.03}$ | 69.9 ± 5.2 | 0.42 ± 0.01 |
| $CoNi_{.09}Pt_{.10}Ta_{.015}$ | 72.5 ± 2.5 | 0.40 ± 0.01 |
| $CoPt_{.10}Ta_{.015}Ti_{.015}$ | 81.9 ± 13.5 | 0.36 ± 0.06 |
| $CoNi_{.09}Pt_{.10}Ta_{.015}Ti_{.015}$ | 120 ± 15.5 | 0.25 ± 0.03 |

Figure 3:
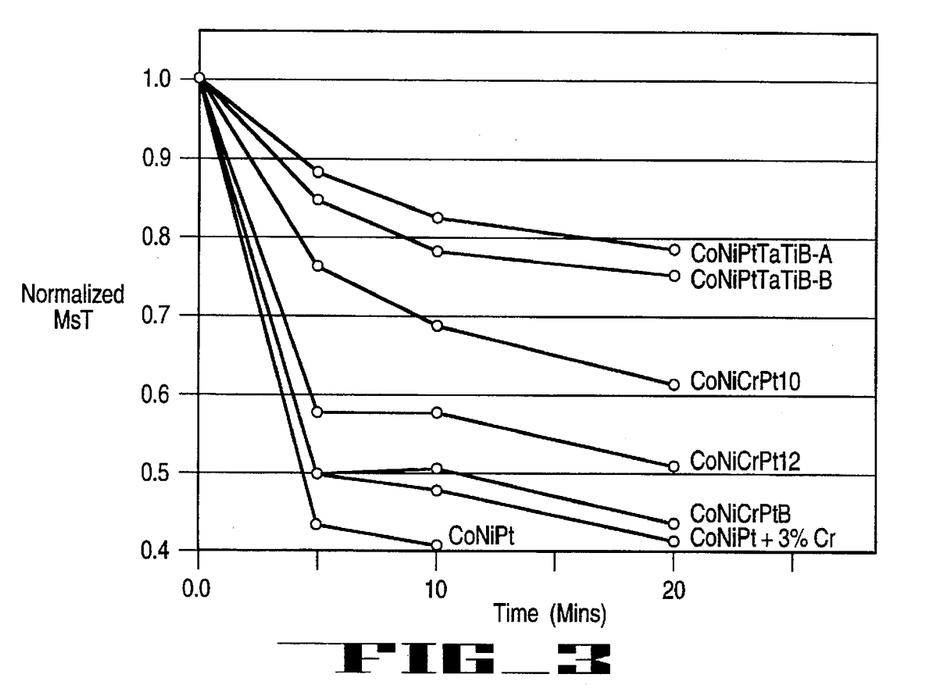
FIG. 3 shows results of an experiment wherein media containing different Co-Pt alloys were exposed to 1.0 N $H_2SO_4$ acid for different lengths of time.

FIG. 3 shows the results of testing the normalized saturation magnetization as a function of time of exposure to aq. 1N $H_2SO_4$ for disks which were prepared in accordance with the teachings of this invention. For the purposes of this test, normalized Ms means the percent change in Ms for each film over time t. That is, the y-axis of FIG. 3 represents $$\text{Normalized Moment} = \frac{MsT_{t=t}}{MsT_{t=0}}$$

The various layers of the disks used in this test were deposited in a batch machine in accordance with the above description. These disks were exposed to 1N $H_2SO_4$ acid for different lengths of time and the saturation magnetization was measured before and after the exposure using a Vibrating Sample Magnetometer ("VSM") made by Digital Measurement System (Burlington, Mass.).

The alloys labeled as CoNiPtTaTiB-A and CoNiPtTaTiB-B each had a composition of $CoNi_{0.07}Pt_{0.12}Ta_{0.015}Ti_{0.015}B_{0.02}$, while the CoNiPtTaTiB-A alloy had a 20 nm thick hydrogenated carbon over layer deposited on top of the thin-film magnetic layer, and the CoNiPtTaTiB-B alloy had a 30 nm thick carbon over layer deposited on top of the thin-film magnetic layer. The alloy labeled as CoNiCrPt 10 had a composition of $CoNi_{0.07}Cr_{0.06}Pt_{0.10}$. The alloy labeled as CoNiCrPt12 had a composition of $CoNi_{0.07}Cr_{0.04}Pt_{0.12}$. The alloy labeled as CoNiCrPtB had a composition of $CoNi_{0.07}Cr_{0.04}Pt_{0.10}B_{0.02}$. The alloy labeled as CoNiPt+3%Cr had a composition of $CoNi_{0.09}Pt_{0.10}Cr_{0.03}$. Finally, the alloy labeled as CoNiPt had a composition of $CoNi_{0.09}Pt_{0.10}$. Except as otherwise specified, all the media had a 30 nm thick carbon over layer deposited on top of the thin-film magnetic layer.

Each of the alloys illustrated in FIG. 3 demonstrated a reduction in MsT over time when exposed to the $H_2SO_4$. That is, each of the alloys exhibited corrosion over time, in different degrees. It is to be noted from FIG. 3 that normalized MsT remains highest over time for the $CoNi_{0.07}Ta_{0.015}Ti_{0.015}Pt_{0.12}B_{0.02}$ alloy. Thus, this alloy exhibits the highest resistance to corrosion of the alloys listed in FIG. 3.

Figure 4:
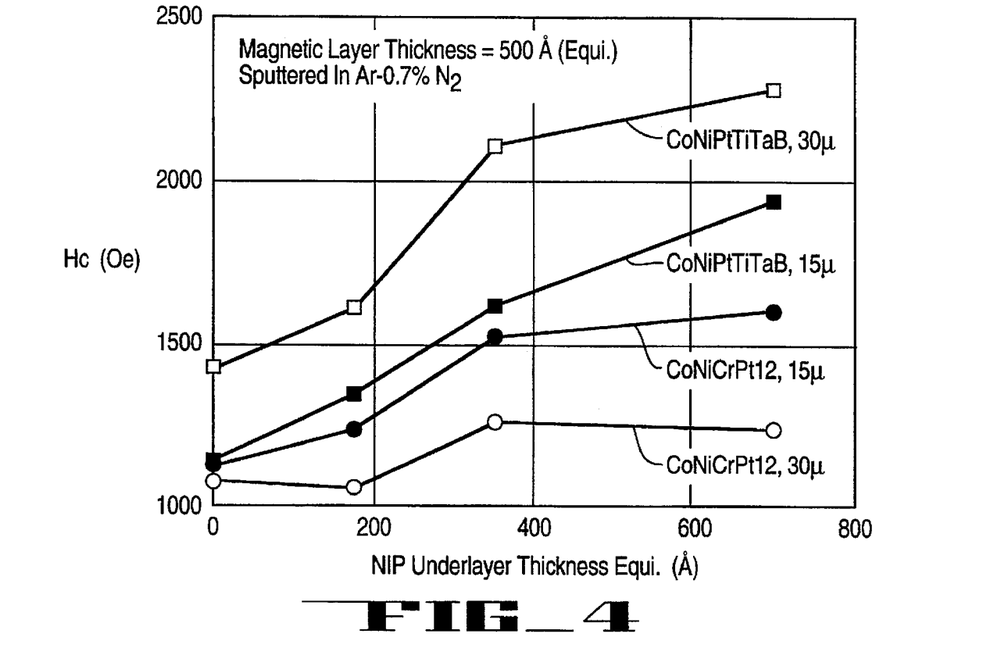
FIG. 4 shows the relationship between the coercivity of various sputtered alloys and the under layer thickness.

With reference to FIG. 4, there is shown therein a comparison of the Hc of two alloys, $CoNi_{0.07}Pt_{0.12}Ta_{0.015}Ti_{0.015}B_{0.02}$ and $CoNi_{0.07}Cr_{0.04}Pt_{0.12}$, as a function of the thickness of the sputtered NiP under layer. These disks were sputtered in accordance with the descriptions provided above. Sputtering was performed under the identical conditions for each alloy, at argon pressures of 15 mTorr and 30 mTorr, as labeled, with 0.7% $N_2$ introduced into the sputtering chamber. The magnetic layer thickness was kept constant for the two alloys. As FIG. 4 clearly illustrates, the $CoNi_{0.07}Pt_{0.12}Ta_{0.015}Ti_{0.015}B_{0.02}$ alloy achieved a consistently higher Hc than the $CoNi_{0.07}Cr_{0.04}Pt_{0.12}$ alloy under identical sputtering conditions, and can easily achieve an Hc of greater than 1600 Oe. Thus, in addition to providing increased resistance to corrosion, the $CoNi_{0.07}Pt_{0.12}Ta_{0.015}Ti_{0.015}B_{0.02}$ alloy is superior for high Hc-high density recording applications.

We also measured the saturation magnetization, Ms, for the two alloys $CoNi_{0.07}Pt_{0.12}Ta_{0.015}Ti_{0.015}B_{0.02}$ and $CoNi_{0.07}Cr_{0.04}Pt_{0.12}$. The thickness of the films were measured using a Dektak-II stylus probe (Sloane, Santa Barbara, Calif). The Ms of the two alloys was measured using a Digital Measurement Systems VSM. The Ms of the $CoNi_{0.07}Pt_{0.12}Ta_{0.015}Ti_{0.015}B_{0.02}$ alloy was determined to be 783 emu/cc, and the Ms of the $CoNi_{0.07}Cr_{0.04}Pt_{0.12}$ was determined to be 723 emu/cc. This suggests that the $CoNi_{0.07}Pt_{0.12}Ta_{0.015}Ti_{0.015}B_{0.02}$ alloy exhibits a higher intrinsic Ms than the $CoNi_{0.07}Cr_{0.04}Pt_{0.12}$ alloy.

Referring now to FIGS. 5 through 8, there is shown therein plots of the recording properties of the two alloys $CoNi_{0.07}Pt_{0.12}Ta_{0.015}Ti_{0.015}B_{0.02}$ and $CoNi_{0.07}Cr_{0.04}Pt_{0.12}$, which were sputtered in accordance with this invention. The media containing the two alloys were sputtered at an argon pressure of 15 μm, the under layer was sputtered NiP of thickness 50 nm, and the magnetic layer thickness was adjusted to give a remnant-magnetization product, Mrt, of 2.7 memu/cm². These media were tested using a Guzik-311 Tester (manufactured by Guzik Corp., Santa Clara, Calif.) using a thin film head of track width 12 μm, and pole and gap widths (p1/g/p2) of 3.5 μm/0.4 μm/3.5 μm. The head flying height was about 0.1 μm at a linear velocity of 9.55 m/sec. The recording properties were measured at a recording frequency of 50 KFCI (thousand flux changes per inch).

Figure 5:
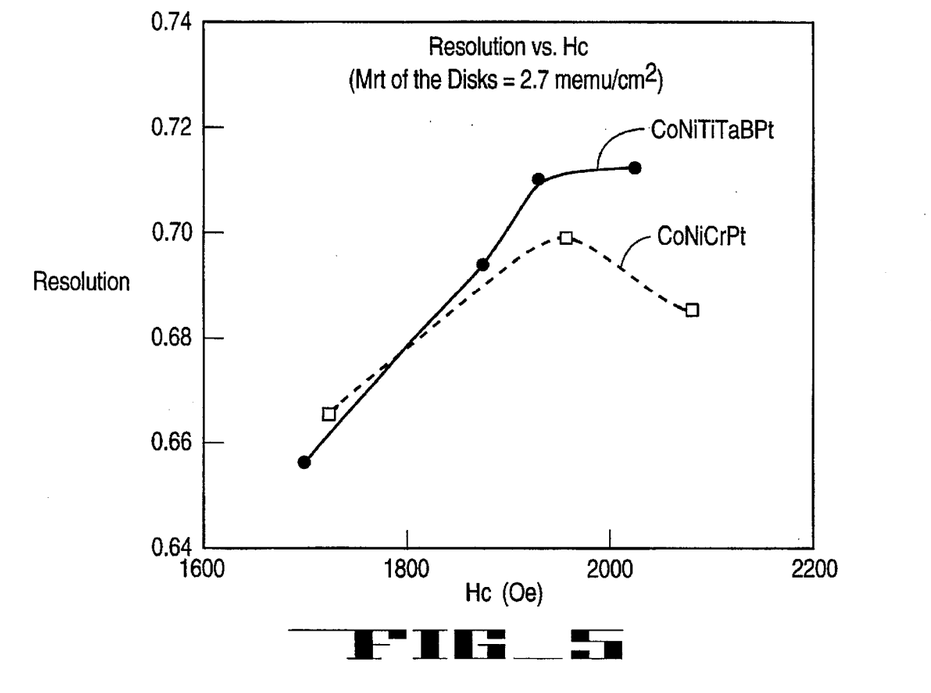
FIG. 5 show the results of recording measurements of $CoNi_{0.07}Ta_{0.015}Ti_{0.015}B_{0.02}Pt_{0.12}$ and $CoNi_{0.07}Cr_{0.04}Pt_{0.12}$, specifically Resolution vs. Hc.
Figure 6:
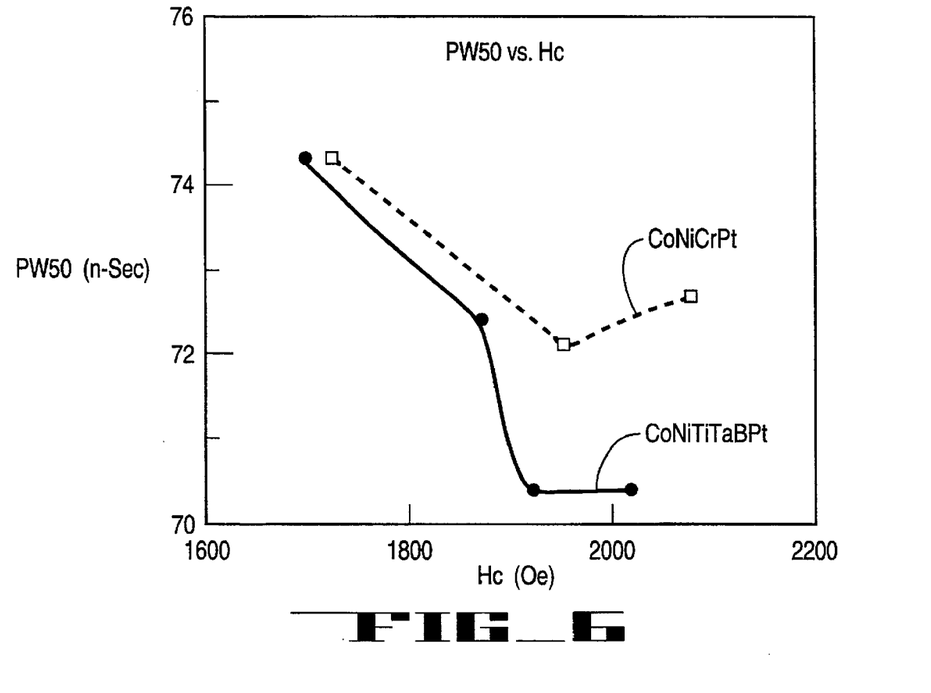
FIG. 6 show the results of recording measurements of $CoNi_{0.07}Ta_{0.015}Ti_{0.015}B_{0.02}Pt_{0.12}$ and $CoNi_{0.07}Cr_{0.04}Pt_{0.12}$, specifically PW50 vs. Hc.
Figure 7:
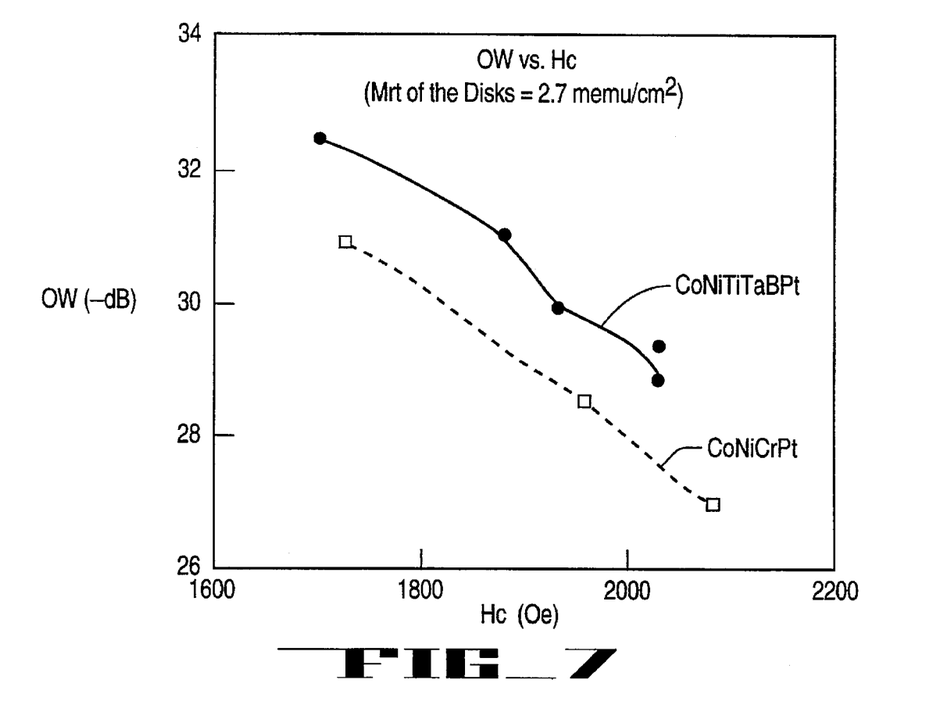
FIG. 7 show the results of recording measurements of $CoNi_{0.07}Ta_{0.015}Ti_{0.015}B_{0.02}Pt_{0.12}$ and $CoNi_{0.07}Cr_{0.04}Pt_{0.12}$, specifically overwrite vs. Hc.
Figure 8:
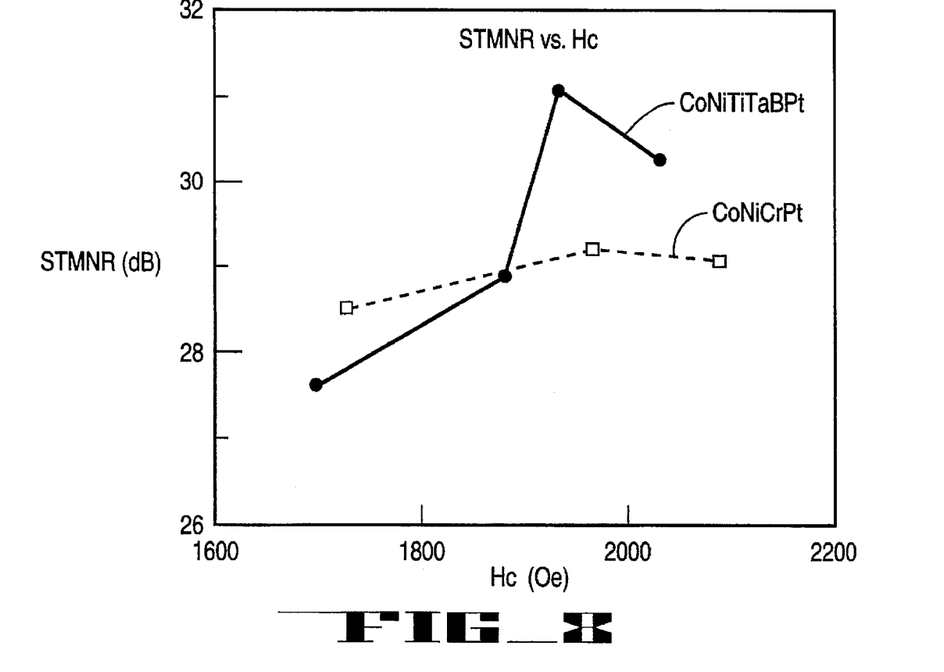
FIG. 8 show the results of recording measurements of $CoNi_{0.07}Ta_{0.015}Ti_{0.015}B_{0.02}Pt_{0.12}$ and $CoNi_{0.07}Cr_{0.04}Pt_{0.12}$, specifically signal-to-media-noise ratio vs. Hc.

As illustrated in FIG. 5, we have found that the resolution as a function of coercivity of the $CoNi_{0.07}Pt_{0.12}Ta_{0.015}Ti_{0.015}B_{0.02}$ alloy was improved over the $CoNi_{0.07}Cr_{0.04}Pt_{0.12}$ alloy at higher coercivity values, for example above around 1800 Oe. We have also found, as illustrated by FIG. 6, that PW50 as a function of coercivity for the $CoNi_{0.07}Pt_{0.12}Ta_{0.015}Ti_{0.015}B_{0.02}$ alloy was improved over the $CoNi_{0.07}Cr_{0.04}Pt_{0.12}$ alloy at higher coercivity values, for example above around 1700 Oe. As illustrated in FIG. 7, OW of the $CoNi_{0.07}Pt_{0.12}Ta_{0.015}Ti_{0.015}B_{0.02}$ alloy was found to be generally consistently above that for the $CoNi_{0.07}Cr_{0.04}Pt_{0.12}$ alloy for all tested values of coercivity. Finally, we found that the SNR as a function of coercivity of the $CoNi_{0.07}Pt_{0.12}Ta_{015}Ti_{0.015}B_{0.02}$ alloy improved over that of the $CoNi_{0.07}Cr_{0.04}Pt_{0.12}$ alloy for coercivity values greater than about 1900 Oe. These results indicate that the $CoNi_{0.07}Pt_{0.12}Ta_{0.015}Ti_{0.015}B_{0.02}$ is a superior alloy for high Hc-high recording density applications, such as those in the regime above about 1800 Oe.

We also examined various recording and corrosion resistance properties among several alloys with varying concentrations and relative proportions of Ta and Ti, which are summarized in Table 2. Each of the alloys listed in Table 2 were sputter deposited and tested in like manner and under like conditions, as described above. The Mrt of each of the alloys in Table 2 was approximately 2.4 memu/cm². The column labeled Corrosion Resistance corresponds to the percent Ms remaining after a 10 minute exposure to 1N $H_2SO_4$. Table 2 indicates that the introduction of selected proportions of both Ta and Ti provide an alloy for recording media exhibiting improved characteristics over both an alloy containing only Ta and an alloy containing Cr but not Ta or Ti. Specifically, the proper selection of the concentrations and ratio of tantalum and titanium provide a magnetic alloy which demonstrates improved corrosion resistance and, in general, improved magnetic properties over an equal or greater mount of the nonmagnetic chromium or tantalum alone.

TABLE 2

| Alloy | Hc (max.) (Oe) | Ms (emu/cc) | S* | Corrosion Resistance (%) |
|---|---|---|---|---|
| $CoNi_{.07}Pt_{.14}Cr_{.04}$ | 1950 | 740 | 0.88 | 20 |
| $CoNi_{.07}Pt_{.14}Ta_{.04}$ | 2250 | 810 | 0.82 | 45 |
| $CoNi_{.07}Pt_{.14}Ta_{.015}Ti_{.015}B_{.02}$ | 2800 | 790 | 0.84 | 27 |
| $CoNi_{.07}Pt_{.14}Ta_{.02}Ti_{.02}$ | 2700 | 800 | 0.85 | 57 |
| $CoNi_{.07}Pt_{.14}Ta_{.03}Ti_{.01}$ | 2300 | 810 | 0.88 | 60 |

Figure 9:
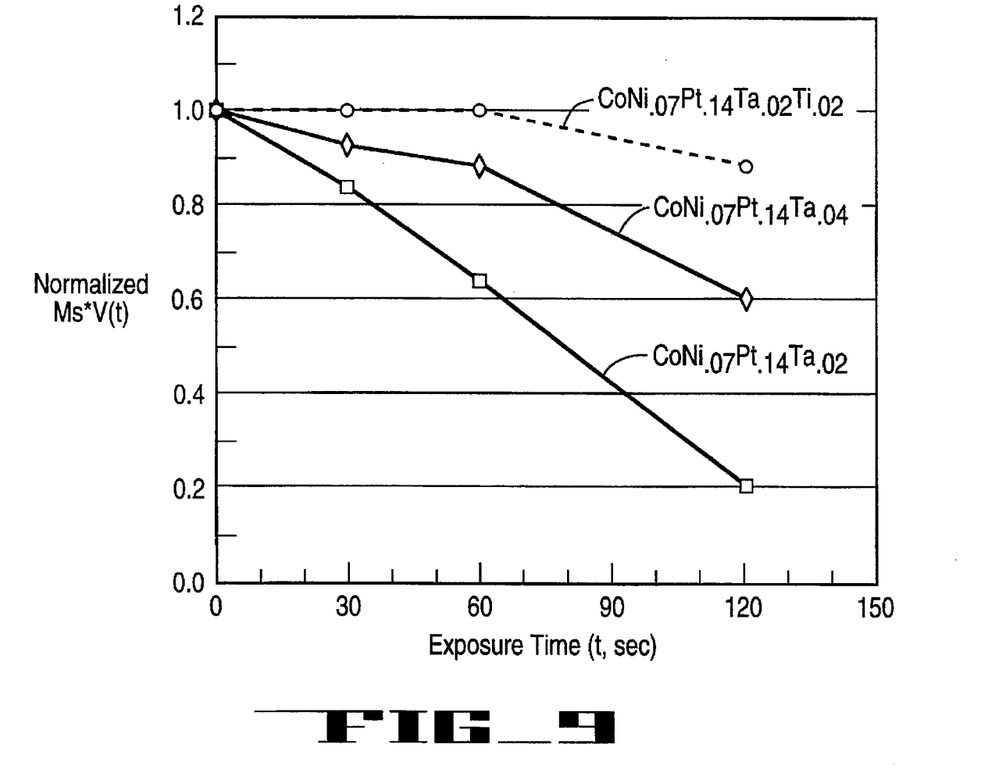
FIG. 9 shows results of another experiment wherein media containing different Co-Pt alloys were exposed to 1.0 N $H_2SO_4$ acid for different lengths of time.

As a final evaluation of the alloy system including Ta and Ti according to the present invention, we investigated the corrosion resistance of CoPt-based alloys which include both Ta and Ti and similar alloys including only Ta. The alloys of this comparison were formed and tested in like manner as described above. The results of these evaluations are illustrated in FIG. 9. As can be seen from FIG. 9, the $CoNi_{0.07}Pt_{0.14}Ta_{0.02}Ti_{0.02}$ alloy demonstrated superior corrosion resistance to the similar alloy which included Ta but not Ti. From this we conclude that the specific combination of Ta and Ti is important to the operation of this alloy system. Specifically, the results of our research indicate that the ratio of tantalum to titanium should be in the range between three parts tantalum to one part titanium (3:1) and one part tantalum to three parts titanium (1:3). Furthermore, the results of our research indicate that the overall concentration of each of the tantalum and titanium in the alloy should preferably be between 1.5 and 3.0 at.%.

While the invention has been described above with respect to the specific embodiments, those skilled in the art will appreciate that modifications may be made without departing from the spirit and scope of the invention. For example, deposition techniques other than the described sputtering, such as plating, evaporation, ion beam sputtering, etc., may be employed. Likewise, the NiP layer and the nucleation may be replaced with Cr, W, Cr-V, Ta, etc., and under layers with different sublayers such as Ti, Ti-oxide, Cr, Cr-oxide, etc., may also be used and are therefore within the scope of the present invention.

In addition, while the present invention has been described in terms of thin-film sputtered media for high density recording applications, other applications are contemplated. For example, the addition of Ta (and Ti) can be used to enhance the corrosion resistance of permanent magnets of such materials as NdFeB, CoSm, and other types of rare-earth magnets. Furthermore, soft magnetic materials like Ni-Fe, Fe-N, etc., which are used in the fabrication of thin-film recording heads, also suffer from poor corrosion resistance. These alloys may have an enhanced corrosion resistance by the addition of small amounts of Ta (and Ti). Accordingly, all such modified applications should fall within the scope and contemplation of the present invention.

What is claimed is:

1. A magnetic recording medium, comprising:

a substrate;

a plated layer deposited onto said substrate;

a nucleation layer of sputtered amorphous NiP deposited onto said plated layer;

a magnetic alloy layer deposited onto said nucleation layer, said magnetic layer comprising platinum up to 20 atomic percent, nickel up to 10 atomic percent, at least 75 atomic percent cobalt, tantalum up to 10 atomic percent, and titanium up to 10 atomic percent, the ratio of tantalum to titanium being between in the range of 3:1 and 1:3, said magnetic alloy layer simultaneously having improved corrosion resistance, higher coercivity, and higher saturation as compared to said magnetic alloys not including tantalum and titanium in said ratio range; and a protective over layer deposited onto said magnetic layer; and a lubricant layer deposited onto said protective over layer.

2. The magnetic recording media of claim 1, wherein the concentration of tantalum is between 1.5 and 3.0 atomic percent, the concentration of titanium is between 1.5 and 3.0 percent, the ratio of tantalum to titanium is 1:1, and said magnetic alloy layer further comprises boron in a concentration of 2.0 percent.

3. The magnetic recording media of claim 2, wherein said magnetic alloy layer further comprises nitrogen in a concentration of up to 10 atomic percent.

* * * * *